(12) United States Patent
Hope (10) Patent No.: US 9,678,205 B2
(45) Date of Patent: Jun. 13, 2017

(54) METHOD FOR OBSERVING AND RECORDING THE IDENTITY, POSITION AND MOVEMENT OF ONE OR MORE VESSELS IN SPECIFIC WATERS OR SAILING LINE

(71) Applicant: Bjørn Hope, Lommedalen (NO)

(72) Inventor: Bjørn Hope, Lommedalen (NO)

( * ) Notice: Subject to any disclaimer, the term of this patent is extended or adjusted under 35 U.S.C. 154(b) by 347 days.

(21) Appl. No.: 14/386,344

(22) PCT Filed: Mar. 16, 2013

(86) PCT No.: PCT/NO2013/050054
§ 371 (c)(1),
(2) Date: Sep. 19, 2014

(87) PCT Pub. No.: WO2013/141712
PCT Pub. Date: Sep. 26, 2013

(65) Prior Publication Data
US 2015/0042505 A1    Feb. 12, 2015

(30) Foreign Application Priority Data

Mar. 21, 2012    (NO) .................................... 20120335

(51) Int. Cl.
*G01S 13/93* (2006.01)
*G01S 5/06* (2006.01)
(Continued)

(52) U.S. Cl.
CPC ............ *G01S 13/9307* (2013.01); *G01S 5/04* (2013.01); *G01S 5/06* (2013.01); *G01S 13/91* (2013.01); *G01S 13/74* (2013.01)

(58) Field of Classification Search
CPC ........... G01S 13/9307; G01S 5/04; G01S 5/06
(Continued)

(56) References Cited

U.S. PATENT DOCUMENTS 4,393,382 A    7/1983    Jones
4,403,220 A *  9/1983    Donovan ............ G01S 13/9303
                                                    342/29
(Continued)

FOREIGN PATENT DOCUMENTS

DE         2536117 A1    2/1977
EP       1 735 638 B1   10/2008
(Continued)

*Primary Examiner* — Marcus Windrich
(74) *Attorney, Agent, or Firm* — Birch, Stewart, Kolasch & Birch, LLP (57) ABSTRACT

A method to automatically and continuously provide surveillance based on central and/or distributed surveillance of presence, positions, movements and movement pattern of one or more vessels in narrow waters, a sailing lane or where danger of collision with other vessels or other fixed or floating objects may occur. A vessel emits a sweeping signal that repeatedly hits one or more detectors, which detect the character of the sweeping signal and the time intervals between the signal hits on the respective detector. The exact position of the vessel and/or movements is calculated at least on the basis of trigonometric principles, and the vessel identity is produced by using signal analysis to extract the characteristic signal sequences from the received detection signals, which are related to the transmitted radar signal(s) from the vessel(s).

19 Claims, 4 Drawing Sheets

(51) Int. Cl.
*G01S 13/91* (2006.01)
*G01S 5/04* (2006.01)
*G01S 13/74* (2006.01)

(58) Field of Classification Search
USPC .......................................................... 342/41
See application file for complete search history.

(56) References Cited

U.S. PATENT DOCUMENTS

| | | | | |
|---|---|---|---|---|
| 4,796,198 | A * | 1/1989 | Boultinghouse | G01S 17/06 180/167 |
| 4,811,228 | A | 3/1989 | Hyyppa | |
| 5,008,557 | A * | 4/1991 | Noji | G01S 17/87 180/169 |
| 6,664,916 | B1 * | 12/2003 | Stafford | G01S 13/91 342/159 |
| 6,771,205 | B1 * | 8/2004 | Barton | G01S 13/72 342/13 |
| 8,111,187 | B2 * | 2/2012 | Newham | G01S 7/021 342/147 |
| 8,410,974 | B2 * | 4/2013 | Kojima | G01S 7/066 342/147 |
| 8,423,278 | B2 * | 4/2013 | Kondo | B63B 49/00 342/176 |
| 8,612,129 | B2 * | 12/2013 | Gagliardi | G08G 3/02 342/41 |
| 2006/0044179 | A1 * | 3/2006 | Fossum | G01S 13/82 342/46 |
| 2006/0132348 | A1 * | 6/2006 | Valand | G01S 7/021 342/13 |
| 2006/0176208 | A1 | 8/2006 | Gounalis | |
| 2006/0238406 | A1 * | 10/2006 | Nohara | G01S 7/003 342/90 |
| 2009/0315756 | A1 * | 12/2009 | Imazu | B63B 43/18 342/41 |
| 2010/0027715 | A1 | 2/2010 | Gounalis | |
| 2011/0063163 | A1 * | 3/2011 | Kojima | G01S 7/066 342/179 |
| 2011/0140950 | A1 * | 6/2011 | Andersson | G01S 5/0072 342/32 |
| 2011/0316743 | A1 * | 12/2011 | Chantz | G01S 5/04 342/367 |

FOREIGN PATENT DOCUMENTS

| | | |
|---|---|---|
| GB | 636185 | 4/1950 |
| GB | 652709 | 5/1951 |
| GB | 1 313 928 | 4/1973 |
| GB | 2 101 829 A | 1/1983 |
| GB | 2 214 025 A | 8/1989 |
| NO | 822326 | 1/1983 |
| NO | 172012 B | 2/1993 |
| WO | WO 2004/113949 A1 | 12/2004 |
| WO | WO 2007/142532 A1 | 12/2007 |

\* cited by examiner

METHOD FOR OBSERVING AND RECORDING THE IDENTITY, POSITION AND MOVEMENT OF ONE OR MORE VESSELS IN SPECIFIC WATERS OR SAILING LINE

CROSS REFERENCE TO RELATED APPLICATIONS

This application is a National Phase Application of International Patent Applicant PCT/No2013/050054 filed Mar. 16,2013 which claims benefit under 35 U.S.C. §119(a) to patent application Ser. No. : 20120335 filed in Norway on Mar. 21,2012.

FIELD OF INVENTION

The present invention includes a method for determining at least one motion characteristic in terms of position, speed and/or course of at least one marine vessel that moves in waters, e.g. coast lines, fjords and/or sailing lane, relative to fixed or floating radar signal reflective areas, places or installations, said vessel transmitting at least one in the horizontal plane rotational sweeping radar signal and which in relation to known positions causes determination of said at least one motion characteristic, as indicated in the preamble of the attached claims.

In addition, the invention intends to enable unambiguous detection of the presence of vessels within a larger region, and their relative positions and movements, movement patterns relative to one another and relative to obstructions and danger areas.

More particularly, the invention relates to a distributed ship surveillance system for monitoring coastlines or fjords and approach areas in order to avert ship disasters, i.e. a "precautionary" warning system for warning of a possible disaster situation. It may be specific sea routes or when there is a need for notification when the vessels are too close each other and/or offshore installations, for example safety zones around oil installations at sea etc. It is of course also important to identify position and course in cases where the vessel is operating near hazard areas, such as reefs, islets and shoals.

DESCRIPTION OF RELATED ART

In light of the prior art could be mentioned detection of radar signals from one or more vessels to determine the position and heading of such vessels, but radar detectors in itself is no novelty. These consist of simple electronic devices used in many applications.

To further elucidation of the prior art for detecting the presence of a vessel in waters, such as a vessel within a specified range, different types of observations by means of visual, acoustic and electronic means can be used. The most common are various radar systems that have a certain degree of coverage and which on the basis of reflections indicates a vessel's position and movement. In narrow waters are also used video systems where a majority of video cameras are placed at strategic locations for observing fishing vessels and their movement in a traffic area. Recently, it has been presented various forms of surveillance based on satellite, GPS or similar, including also the system Automatic Identification System (AIS). These systems are generally intended to be an aid for the vessel's own navigation.

In the patent literature, it is also described various devices on the vessel from which it is made bearings towards known points. Besides the normal use of the different radars from the vessel, it is also disclosed other methods in British Patent GB 636185 and GB 652709 and the Norwegian Patent Applications 19822326 and 19872051. In addition, there are a variety of electronic navigational aids which are not relevant in this context because it mostly deals with utilities to provide navigational information on the vessel and which is only intended for the vessel's own use.

U.S. Pat. No. 4,796,198 describes a position determining system based on a laser beam that rotates about an axis of the vessel. The laser beam hits the reflectors disposed at known positions and are reflected back to the vessel where it, by using a mirror arrangement, is converted to an electric pulse using an optical detector. Navigation information is presented as a pulse pattern which forms the basis for calculating the position of the vessel from the angles of the vessel to the respective reflectors. U.S. Pat. No. 5,008,557 relies principally on the same procedure.

The German patent DE 2536117 describes a method for localizing a location fixed radar system with a rotating transmitting antenna based on the measurement of time intervals at three measurement points along a base line. The position is calculated from the angles shown by the relationship between the time intervals and knowledge of whether the transmitter is on one or the other side of the base line.

Likewise there is a similar system in British Patent GB 2,214,025 which describes the location of an object in which the angles calculated from the orbit cycle of the radar antenna and registered at two points. The calculation of the position is in principle to estimate the radius of a circle that intersects two, alternatively three observation points that lie on the same circle as the object's position. It is clear from the description that the position calculation is burdened with problems relating to unambiguity, especially when multiple vessels are within a coverage area. There are problems with the elimination of the so-called fictitious localizations of the object, so-called "ghosts" or "phantom" localizations, and that these may occur in numbers and combinations corresponding to the number of objects in the second power. Likewise is described that in connection with the location of possible positions, a correlation process, which is not further described, is necessary to distinguish the real positions from so-called "ghost signals". The set does not allow a continuous surveillance over a larger coverage area comprising a successively variety of detector configurations based on geometric relationships, relative to the position of the vessel.

WO A1 2004/113949 describes an advanced orientation sensitive detection system for transmitted radar signals by means of an electronic support measuring (ESM) unit consisting of an advanced antenna/receiver system with twenty parallel receivers divided into different sub-channels, where at least four sets of antennas point in different directions divided into sectors so as to detect the orientation from the detector system position to the vessel radar. It is achieved a form of cross-bearing by detecting the direction to the signal source (radar) from at least two different known positions, thereby using trigonometric principles to calculate vessel position. The patent further describes an advanced receiver system with multiple antennas and methods of signal processing and analysis of the received signal. As appears from the patent description, the system is based on battery operation and is intended to be portable and easily displaceable.

US2006/0176208 A1 describes an advanced receiver system in the form of a plurality of receiver devices arranged in an array for directional determination. The system detects/registers a unique signal pattern in the form of a predetermined time interval designated as breaks or "dwells". By means of signal analysis and advanced signal processing the signal amplitude is controlled in order to distinguish the characteristic "dweller" signals from noise. The known system seems to be a military system for detecting missiles or other forms of weapon systems.

U.S. 2010/0027715 A1 discloses a system and purpose as above, i.e. a supplement to the way the signals are processed and stored, as well as the importance of recognizing the characteristic "dwell" pattern. Described is a range scan receiver for detecting signals by using different analysis and algorithms to identify the signal source.

The above-described known solutions are generally based on the registration of the vessel's transmitted radar signals by means of complex and costly direction sensitive receiver units. Using the registration of direction from at least two receiving units to the vessel radar, the position of the vessel is calculated by using trigonometric methods. It appears neither from these descriptions that the purpose is to achieve a monitoring system for a given coverage area.

A further known solution shown in European Patent EP 1735638-B1 discloses a method and system for determining the relative position between two or more objects in a marine environment, of which at least one object can be maneuvered relative to one or more other objects. At least one radar transmitter is arranged at one or more of the objects and transmits a radio wave signal to at least one transponder arranged on one or more of the other objects. The radio wave signal used is a FMCW signal. Signals are processed to determine the distance, direction and relative speed between the radar transmitter and one or several transponders being simultaneously measured and calculated. A complex signal is produced, equivalent to a complex vector representing the amplitude and phase for each upper and lower sideband, and for frequency swept up and swept down. The vectors can be used to calculate the angle between each transponder and the radar transmitter.

SUMMARY OF THE INVENTION

The present invention is intended to remedy some of the disadvantages and limitations associated with the prior art and provide a method and a system that is operationally simpler and cheaper than those hitherto available.

The present invention therefore provides a method of the initially mentioned type.

In a first aspect of the invention the method is characterized by the steps:
a) using at least three detector units placed at defined, known fixed and/or changeable positions in said areas, locations or installations successively receiving the sweeping radar signal,
b) establishing successively signal vectors between the vessel and respective positions of the detector devices as the radar signal by its rotational sweep successively hit the respective detector units,
c) calculating angles between the successive signal vectors as a function of time intervals between signals which are detected as the radar signal beam hits the respective detectors in repeated cycles,
d) calculating on the basis of the estimated signal vector angles a common intersection point for the vectors in order to calculate the position of the vessel,
e) based on repeated cycles of radar signal beam rotation sweep repeating steps a)-d) and thereby determining the incremental position change of the vessel and thereby speed, course and patterns of movement of the vessel.

f) signal processing in steps a)-e) of the radar signals received from the detectors and originating from the vessel by continuously selecting those at any time optimal combinations of said measured time intervals as a function of mutual geometric relations between the vessel and respective positions of the detectors, wherein the selection takes place as a function of one or more of: angular distribution between signal vectors, mutual spacing between signal vectors, the signal quality of the received signals and the signal strength of the received signals,
g) comparing the vessel position, speed and/or course with acceptable limits relative to fixed or moving obstacles in the waters where the vessel is located, and
h) to initiate alert functions, such as warning or alarm if the vessel movements exceed these limit values or if the radar signals from the vessel cease.

In a second aspect of the invention, the invention is characterized by:
a) successively detecting the sweeping radar signal from the vessel by placing at least one detector unit in a position on or close to a potential collision object for the vessel,
b) establishing a reference vector coinciding with a course position line leading to a collision object,
c) establishing, when the vessel is at an initial range of course position line, a first signal vector between the vessel and the position of the detector unit when the radar signal by its rotational sweep initially hits the detector unit, the vessel is on the course position line and the signal vector and the reference vector thus coincide,
d) based on repeated cycles of radar signal beam rotational sweep to calculate an angle between the first signal vector equal to the reference vector as a function of a time interval between signals successively detected from the radar signal beam and thereby determine possible incremental change of course of the vessel and compare this with acceptable limit values,
e) initiating alert functions such as warning or alarm, if the change of course of the vessel does not meet the limit values, i.e., the vessel has not in time made a change of course away from the reference vector when maneuvering into a dangerous area along the course position line, or if radar signals from the vessel cease.

Those for the invention further embodiments by these two aspects are stated in the respective subordinate claims.

The present invention does not require special equipment or installations at the vessels or involvement by the vessel crew. Likewise, the system is basically intended to operate as a fully self-contained, passive and automatic monitoring system.

The present described invention is quite different from the prior art in that the invention provides a complete system in the form of a distributed network of passive co-acting, non-directional oriented (omni-directional) receiver units or detectors which communicate with a central signal processing unit via known ways of communication, and from there notification and messaging are distributed to appropriate authorities or users also include the vessel (s). Position determination for the vessel or vessels takes place by the registration of the time intervals as the rotating radar beam hits the respective detectors.

The term "passive" detectors means here that they do not emit electromagnetic radiation into the environment. In addition, these detectors could be a "sleeper" and be activated from its "sleep" by a radar beam hitting the detector or in that the whole system of detectors are "awakened" if only one or a few detectors are being hit by a sweeping radar beam. This means that a plurality of detectors is in principle also function as a continuous surveillance system detecting all kinds of radar activity covering a large area.

A plurality of receiving units or detectors are included in a system in which the individual receiver units are connected via a communications network to a system processing unit. From the continuously received interval signals from the activated detectors in the system, the optimal angle combination based on the received time intervals is calculated. The selected angle combinations then form the basis by using trigonometric methods, to calculate the position(s) and movement(s) of the vessel(s) in relation to the positions of the detectors.

Included as a part function of the signal processing is the calculation using known statistical methods, e.g. normalization to establish a reference to the center of the radar signal's lobe strength. This results in a greater level of precision by the calculation of the time intervals and angles between the detectors actually used for the position determination. In this way a recognizable signal pattern or "fingerprint" is obtainable.

The here applied signal analysis differs significantly from other known techniques in that the signals are detected via an omni-directional, non-directional orientated receiving system, meaning that each detector unit in the system is the "omni" type and therefore not directive. For certain applications, however, one or more of the sensor devices in the system used in connection with the method, may be directive.

The information in the signal pattern recorded by the respective receiving devices associated with the vessel's movement, provides a continuous and characteristic change of the signal curves depending on the location, speed and distance of the vessel or vessels from the respective detectors, which contributes both to an increased detection accuracy and provides an important information, which when stored in a database unit, can be used at a later date. In this invention, the term "vessel" of course also includes platforms and similar constructions.

The characteristic features of the invention will become apparent from the following description and also with reference to the accompanying drawings, as only examples of embodiments.

Those via the receiving devices or detectors registered sweeping signal patterns, jointly form a distinctive pattern which by the following signal processing is adapted to measure and predict a hazard for one or more vessels separately or together or other hazards, and communicate this in an understandable manner to the nearby affected vessel (s), responsible authorities and/or to a central monitoring unit. A detector device may for instance be situated at or in the immediate proximity of a collision object/risk place, and arranged to register it from at least one vessel's emitted sweep signal pattern, which based on its signal characteristics and composition will determine whether there is a hazard which in turn triggers an alarm and notification function that can be directly transferred to the vessel or vessels.

In order to optimize and/or correct errors of calculation there is used the natural maneuvering pattern of the vessel or vessels, e.g. course and speed, in connection with the next/nearest position calculations based on known algorithms/filtering methods, e.g. moving average or similar statistical methods for error correction in connection with occasional errors and deviations records received from the detectors, including the prediction of new positions from a number of previous position calculations. The vessel or vessels are identified and so-called "fingerprint" established on the basis of characteristically features and/or differences in transmitted signal's composition and properties of the vessel or vessels, e.g. at least one of the signal modulation, frequency, PRF/PRI, pulse length/shape, side lobes, opening angles and rotation pattern/speed of the antenna.

The characteristic features of those from the transmitted radar signals from at least one vessel are thus completely or partly included as parameters in conjunction with the optimization of determination of the position(s) of the vessel or the vessels, distinguishing nearby vessels and recognition of individual vessels, the so-called "fingerprints" as mentioned earlier. Through appropriate signal processing and signal analysis of one or a plurality of received detector signals, information about position, identification, characterizing and recognizing features of the relevant vessel(s) is extracted, so that it is possible to distinguish signals from multiple vessels within an area of completely or partially coincidental positions and within a smaller number of successive radar sweeps from one or a number of vessels located within the coverage area. By "completely or partially coincidental positions" includes also vessels having more than one radar system in operation.

Likewise, the invention enables, on the basis of received radar signals via sensors/detectors and subsequent signal processing, a) establishing a database of information which is adapted for the detection of vessels and information for determining various warning and alarm conditions, or b) interpretation of various warning and alarm conditions, and which based on given criteria relays information and/or alarms to, for the situation, relevant information and/or alarm recipients, e.g. public agencies or vessels which are designated to maintain general surveillance and alert, prevent and/or limit a vessel/ship disaster (e.g. collision or when sailing in dangerous and/or prohibited areas). Likewise it may be established an information database which is intended for the recognition of vessels on the basis of the recorded detector signals.

By pulsed radar signals there is obtained a higher accuracy when phase shift variations, as a result of the vessel's movement are detected by the respective detectors and are included as additional variables in position calculation, and in addition enables distinguishing several radar units and/or vessels.

The detector or detector unit refers to a receiver unit which is adapted for detecting radar signals within the frequency bands used in the vessel radar, e.g. X and/or S bands.

The detector unit is in principle not direction sensitive except for the ability to restrict/exclude signals from certain directions, i.e. sectors by using e.g. screening. The detector unit is likewise provided with an input protection and an automatic gain control and has an ability to suppress side lobes. The detector unit can exploit the common receiver functions, such as a "Racon". This means that an omnidirectional radar signal receiver unit contains the functions for detecting and relaying useful information.

A "Racon" is a radar transponder (transmitter/responder) that is usually used to mark maritime navigational risks. The word RACON is a combination of RAdar and beaCOM, i.e. a radar beacon. A radar beacon is basically a slightly advanced receiver device that has some common features with regard to reception of radar sweeps within the frequencies used and that some signal processing is being executed, e.g. adjustment of gain and suppression of side lobes. In addition, such radar beacon is adapted to send out an information signal, e.g. alarm and warning signals based on the treated time interval signals back to the vessel and from there can be received by the receiver part of the radar and cause plotting of this information on the radar screen. In connection with the use in the present invention a radar Beacon receiver/detector function and its other functions could be utilized in an advantageous manner. However, when such a radar Beacon transmits signals in return, these signals may include useful information for the vessel at its present position and situation. Effectively, when such a radar beacon returns a signal, its position in the landscape could more easily be detected, unlike detector devices or units which passively detect radar signals from the vessel to determine its sailing characteristics.

One or more Racons or a combination of detector units and Racon can advantageously be used for receiving radar sweep where the time intervals between the strikes is used for the calculation of the vessel's positions and movements etc. One or more Racons can, as indicated, be used to transmit warning and alarm information to the vessels.

The detectors (receiver units) communicate with a signal processing unit, which can be connected to a surveillance station via cable and/or wireless communication connection, wherein the surveillance station is arranged to receive, process and display the results of the fed detector signals, and as previously indicated communicate relevant information (e.g. alerts, alarms, notifications, etc) to one or more users based on pre-specified criteria, possibly also include relevant information regarding the vessel's maneuverability. As an additional feature, the position and motion detection may be used for functions such as control of lighting or triggering, acoustic and visible signals etc. when a vessel reaches a certain predetermined position or area in a predetermined situation.

The detectors (receiver units) with associated signal processing are adapted also to receive and relay message information and/or identification from the vessel in that, in conjunction with modulation of that from the vessel transmitted radar signal being "superimposed" in coded form, information message, e.g. identity of the vessel, alarm or emergency, and/or other forms of messaging that can be detected and decoded into readable information via the detectors. Coded information may take the form of sequential changes/modifications over shorter or longer periods in parts of the transmitted radar signal modulation, for example, such as variation in PRF/PRI, pulse length, pulse shape, pulse strength, radar frequencies etc. and any minor changes of the antenna movement pattern.

Specific patterns of movement/maneuvering of the vessel(s) over a shorter or longer time periods may be characteristic of a pattern of behavior, such as various forms of fishing or other activities that are relevant in the context of a surveillance. A sudden loss of radar signal will always be interpreted as an alarm signal, whether it is a deliberate act or as a result of emergency or malfunctions. It is also conceivable that said information message may come from secondary radar with the same rotational characteristics as primary radar of the vessel.

The invention will now be further described with reference to the accompanying drawings.

BRIEF DESCRIPTION OF THE DRAWINGS

FIG. 1b shows in perspective a view of a similar, but not identical situation to that shown as in FIG. 1a.

DETAILED DESCRIPTION

Figure 1A:
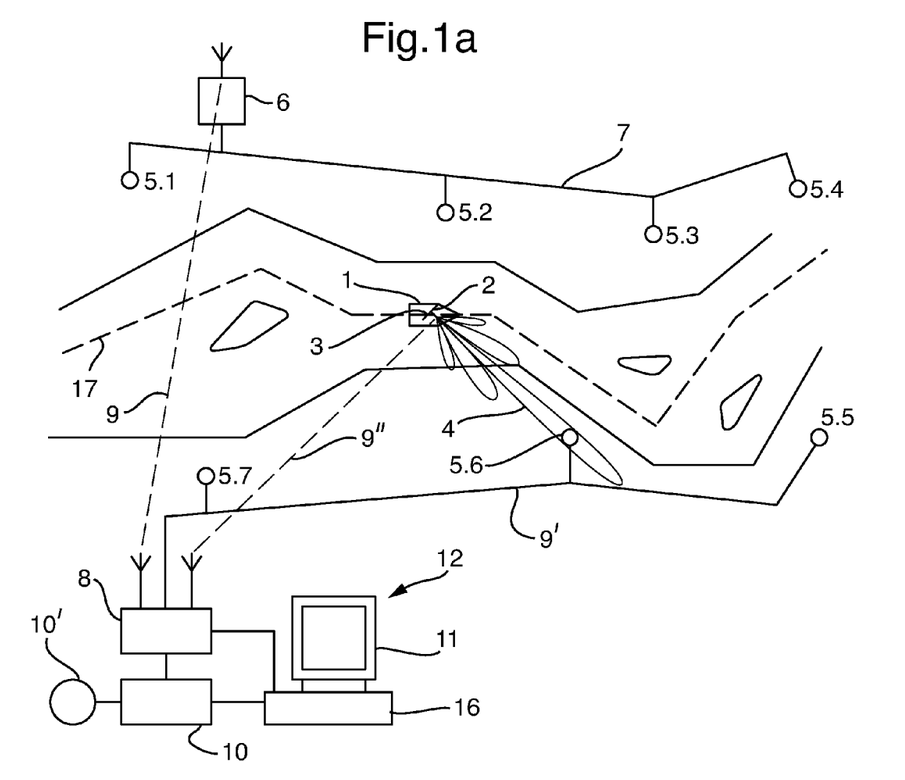
FIG. 1a shows for simplicity reason navigation of only one vessel through waters/sea and being under surveillance according to the invention.
Figure 1B:
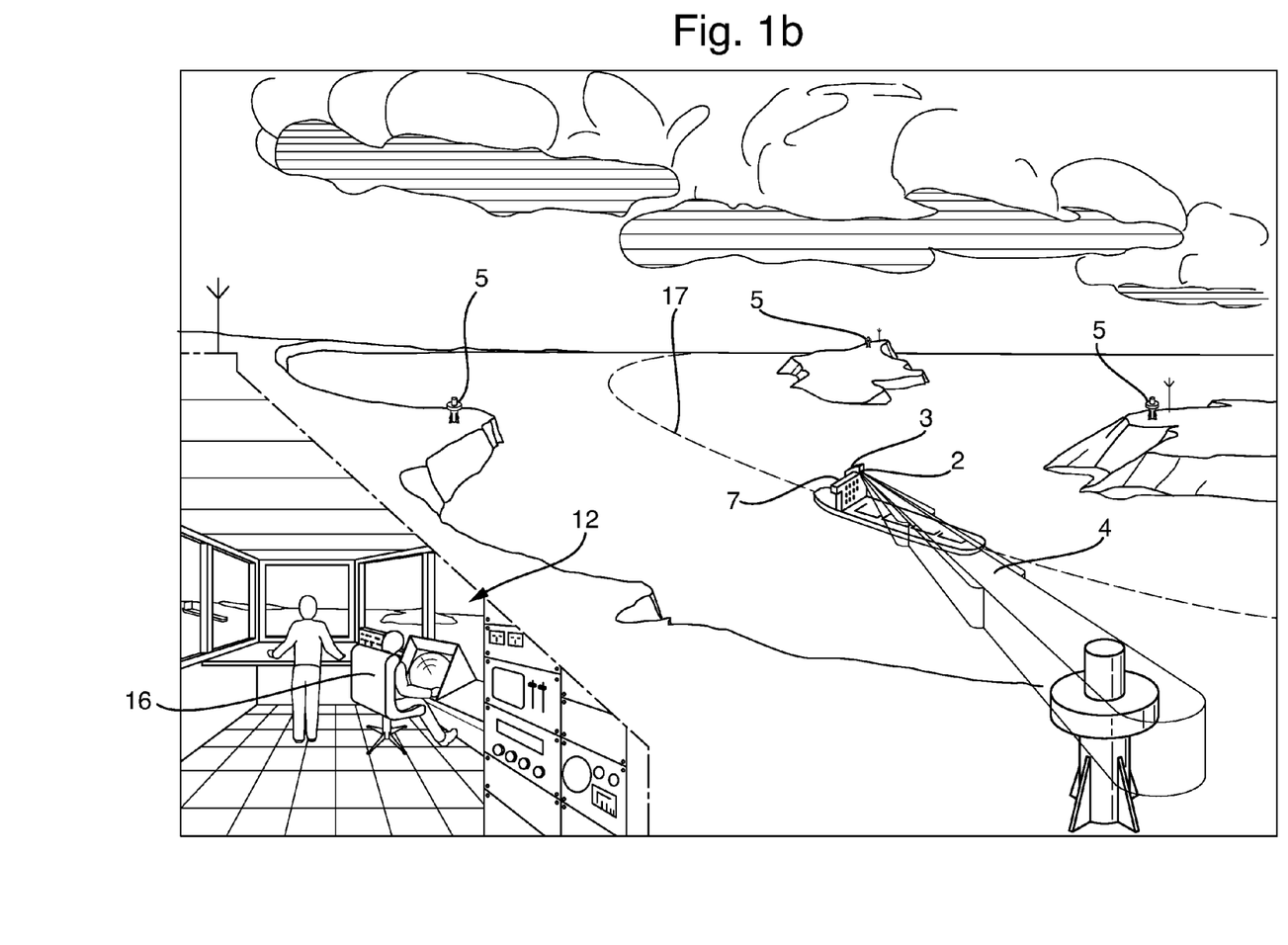

By the following description, emphasis is made on use of the invention in connection with determining the position of a vessel such as a ship 1 as shown in FIGS. 1a and 1b. This means that the vessel is located within a defined coverage area for the detectors 5.1 to 5.7. The detectors are appropriately located in relation to monitoring area in order to provide an optimum coverage area. Position coordinates of the respective detectors 5.1 to 5.7 are therefore known, as these are mainly referred to solid ground or a known movable position. The orientation sensitivity of the detectors may under some circumstances be limited or enhanced by the application of different forms of respectively shielding or amplification. Inter alia, there is thereby prevented undesired disturbances in the form of reflections and the like, for example from the solid ground, the terrain or other objects that are able to reflect radar signals. However, this is not shown on the accompanying drawings.

The rotational speed of the antenna 2 and the resulting signals detected by the detectors 5.1 to 5.7 are decisive for the up-dating time at any time regarding the vessel position and movements.

Using modern computing, the speed is iteratively calculated and the position of the line or course which vessel 1 follows, as well as a good prediction of the vessel's next position between each time the antenna 2 makes a complete sweep in relation to the respective detectors. In this way it is obtained a good filtering and/or suppression of any sporadic calculation errors.

A mobile embodiment of the system could for example be used in connection with military defense and emergency services where the importance of field operations in terms of fast displacements and position establishments are critical.

One advantage is that the invention provides a passive system that has a low energy consumption, and that the energy consumption can be further reduced by the system having a sleep and awakening feature, where the awakening feature activates the system only by recording present radar signals. In this way, the system power supply can be batteries, solar cells or other known power sources.

The fact that the system is passive, i.e. not self-emitting active electromagnetic signals to the environment, the system detectors are not easy to detect from the vessel on the basis of such signals. By using appropriate materials, dimensions and camouflaging of the detectors, it is almost impossible to detect such detectors as distinct radar reflection or by visual observation. Either way, for a crew onboard a vessel it will be impossible to determine if the detectors and the total system are operative or not, as opposed to observe a coastal radar which transmits and rotates a high power radar signal.

Signal information from the respective detectors to a central unit or a monitoring centre 12 may be transferred by using known means, e.g. via cable, fiber optics, wireless in the form of an internal signal transmission and/or total or partly via established communication system or network. For convenience are the various forms of signal information transmission given the common term "communication". In FIG. 1a is such a transfer designated by 7, 9 and 9'.

In FIGS. 1a and 1b is shown the vessel 1 which has the rotary antenna 2 which rotates about its vertical axis 3 and emits a radar beam 4 which rotates about the axis 3 and hits the detectors 5.1 to 5.7 in sequence during each sweep.

The signals from the detectors 5.1 to 5.4, as shown in FIG. 1a are delivered to a central signal processing unit 10 in a manner largely determined by local conditions. It may for instance be applied direct communication from the respective detector unit. Alternatively, multiple detectors can be connected to the centre 6 via communication link 7 which then communicates with a main communication unit 8 which on the figure is shown in the form of a wireless connection 9. Correspondingly, the detectors 5.5 to 5.7 may for example be associated with the unit 8 via a cable connection 9'. As an example, it is also shown that a wireless unidirectional or bidirectional communication link 9" between the vessel and the device 8 can be established.

The main communication device 8 may be located in close vicinity to the signal processing unit 10, a display device 11 and an operation unit 16. These devices constitute in principle a surveillance station 12 which for example can convey relevant information to specific information recipients. This excludes however not that it can be appropriate with less independent, locally located units consisting of both detectors and signal processing devices which in turn can communicate with a main unit and/or other installations for surveillance and alarm, for example installations such as platforms and/or as a supplement to a radar monitored coast and approach area having insufficient radar coverage.

By the system being continuously updated with signal information from the respective detector arrays 5.1 to 5.4 and 5.5 to 5.7, via the communication channels 9 and 9', and transmitted to main communication device 8 which again may be located in a surveillance station 12, it is established, in addition to position data and vessel identification, as previously suggested, different types of warning and alarm functions related to collisions hazards or the vessels' relation to each other or in relation to a position or an area that yields dangers or forbidden areas. As the vessel 1 moves along an appropriate sailing route 17, new detectors located in the coverage area of the vessel radar will become activated. Using appropriate signal processing, those of the detectors which at any given time have the most favorable positions in relation to one or more vessels, will be included in the calculation of position and movements.

The signal processing unit 10 has as main function to extract all relevant information from a relatively large and complex signal information that mainly consists of received detector signals from, in certain cases, a relatively large number of interacting signal receiving detectors and the signal processing unit.

The signal processing includes inter alia signal analysis and calculations based on a variety of criteria that mainly are determined by the user. As previously indicated, the variety of criteria may be related to a recognition or characterization of the relevant vessel, its position, speed, direction and movement patterns and/or the vessel radar equipment on the basis of characteristic signal parameters. Such signal parameters can e.g. be selected from the group consisting of: the radar beam 4 strength (pulse power) and the opening angle (beam sharpness), the antenna 2 rotation time (RPM) and the radar signal pulse repetition frequency and/or pulse repetition interval (PRF/PRI) (which provide information about vessel radar setting or range), the radar beam main lobe and side lobes, the frequency composition (spectrum), pulse length, bandwidth, reflections (e.g. from vessel installations and/or reflections from fixed or floating objects in the vicinity of the detector), signal sequence as a radar sweep passes a detector or the respective ones of a plurality of detectors, and any other forms of signal modulation. In connection with the recognition and recording of the positions and movements, it may be appropriate to have a database function 10' associated with the signal processing unit 10.

Thus the invention relies on the use of detectors, such as e.g. the detectors 5.1 to 5.7, which are positioned in such a way that a signal emitted from the vessel and sweeping in a plane and successively hitting the detectors 5.1 to 5.7, is recorded as time intervals from all of the detectors within the coverage area each time the signal 4 sweeps past the detectors. As shown earlier, the detectors can communicate via network connections 9 and 9' with the signal processor 10 which at any time calculates the angular relationship between the vessel and the respective detectors which are successively hit by the radar signal.

In cases where the vessel 1 is in such a position relative to the detectors that the requirement for unambiguous determination of for example the vessel position, course and speed are not met, the system will still be able to detect that one or more vessels are within a coverage area, as the vessel's relative position change can be detected in addition to the characteristic features of the radar signal. As an example can be mentioned situations where it is desired to detect whether a vessel 1 is located within a certain area or moving along a certain course relative to one or more of the detectors, and where the vessel has a natural sailing route that does not require a detector geometry which satisfies the full unambiguousness for position determination, e.g. in the form of a position line, but still adequate for detection, identification/recognition, and recording of situational factors and any transfer of messages via the vessel's radar system.

The radar signal 4 has a relatively constant rotational speed and a preferably sharp demarcation in the horizontal plane. The radar system of the vessel 1 can be advantageously used as a signal source which by means of the rotating antenna system 2 transmits a narrow beam 4 which sweeps about the axis of rotation 3 of the antenna system. When the transmitted electromagnetic power hits the detectors 5.1 to 5.7, it is registered in the form of a signal which is repeated for each revolution of the antenna 2.

As previously shown and described, the detectors are suitable distributed in the area to be monitored, and will thus be hit by the rotary radar signal at different times, but in general the time intervals between each time the detectors are hit by the signal will form a time pattern, primarily used for position determination, as well as identity and other relevant information being extractable from the residual information in the received detector signal by using known forms of signal analysis.

It is in principle the mutual spacing in time (time intervals) between each time the detectors 5.1 to 5.7 are being hit by the radar beam which form the basis for calculation of angles, with the vessel 1 as an outset. The angles change as the vessel changes position in relation to the respective detectors located at known positions. By trigonometric methods, e.g. back cutting or triangulation, used in land surveying, the exact position of the vessel(s) is determined in a continuous process in terms of the selection of the at any time best combinations of angular distribution between the vessel and the respective detectors. Back cutting or the cutting principle (resection) is also described in the book "Surveying" by Davis, Foote, Kelly, 5 edition, chapter "Triangulation" on page 414.

As the vessel moves within the covering region of the detectors, the detectors that at any time have the most optimal location for the positioning will be used in the position calculation. Thus, it is conceivable that not necessarily all of the registered detectors will be activated by the sweeping signal 4, as some detectors can be located in a shadow zone (shaded) or at unfavourable geometric position with respect to the emitted signal 4. A situation may arise that the signal from one or more detectors is excluded from the position calculation due to unfavourable angle combination relative to the vessel. The detector signals are relayed to the central processor 10 using known transmission methods, such as via cable, optical fibers or in form of wireless transmission systems that can constitute a network. In certain cases it may be appropriate to make some form of local signal processing 6 in the vicinity of the detector in order to achieve a larger or smaller form of data reduction which may inter alia be appropriate in connection with the transfer of information to the central processor which may be located in the remote monitoring station 12.

It may be appropriate that functions are integrated in the receiving device that adapt the receiver's sensitivity as a function of signal strength and a suppression of the side lobes to better establish a signal vector which is representative for the direction of the antenna when the detectors are hit by the sweeping radar beam. Because the detector signals may comprise various forms of interference, such as reflections, variation in signal strength, side lobes and the like, it is convenient to convert the signals to digital form for more easily to process signals digitally for signal analysis, filtering, etc. Thus, it is possible by using known correlation methods to extract phase and/or phase shift relative to the PRF/PRI in connection with the vessel's movement and orientation in relation to one or more of the detectors.

Figure 2:
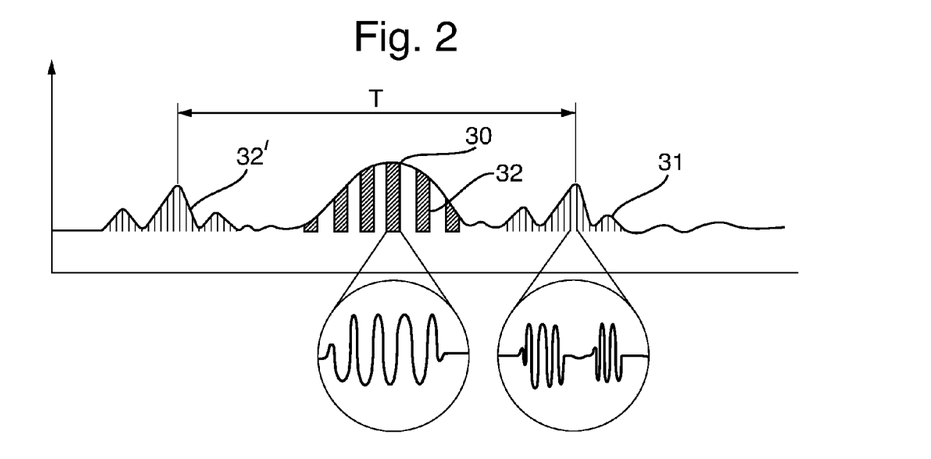
FIG. 2 shows an example of a detector being hit by a radar signal received from single radar sweep, typically PRF/PRI pulses, envelope and side lobes of the detected signal.

This will in principle mean that over a certain period of time a relatively stable radar PRF/PRI is used as a reference and that phase shift between the single pulses, 32, 32' in FIG. 2, as the main lobe repetitively strikes the detectors, is registered as the vessel moves. The phase shifts that occur between every time the main lobe hits the detectors, will change as a result of the vessel's movement and direction in relation to the detectors which at any time are included in the calculation of positions. In this way, a far greater accuracy and an opportunity to correct for any variation in the antenna's rotation speed are obtained. This implies that the angle calculation in connection with the position determination will have a greater accuracy by making use of the entire pulse sequence, which at any time is situated in the lobe when it hits the respective detectors. The purpose is mainly that a sharp and clear demarcation between the individual time intervals that forms the basis for the angle calculation, is obtained, rather than just relying on registration of the time intervals at the envelope curve's peak value in the pulse sequence of the main lobe as it passes the detectors.

As shown in FIG. 2, the peak of the envelope curve 30 is far less precise in connection with the registration of time intervals. Especially when powerful side lobes appear, it is difficult to define the start and stop points for time interval recording. The following description includes the above mentioned as a natural part of the signal processing in the signal processor 10.

FIG. 2 shows a simplified signaling sequence from a detector which on the figure is shown in the form of two completely different radar signals being received. The signal is represented by the envelope curve 30 of the individual radar pulses that may vary in intensity, frequency and/or PRF/PRI. The received signal may also include additional side lobes 31, so that the received detector signal may be composed of a variety of signals from multiple vessels with various radar modulations and/or settings that allow the radar pulses in the main lobe and side lobes partly to be mixed, partly overlap, so that the time intervals from one and the same vessel requires the use of sophisticated signal analysis and automatic adjustment of gain, suppression of side lobes in order to sort out interdependent intervals from noise, reflections and interference between signals from multiple and different vessels operating within the same coverage area. The received signal pattern from one or more vessels forms the basis for an identification on the basis of characteristic properties that partially form the so-called fingerprint, as previously mentioned, of radar signals of the individual vessel, and contributes to ensure a clear separation between the individual vessels in order to calculate the position based on the time intervals between the individual detector hits in the course of each antenna rotation on the respective vessel(s).

Figure 3:
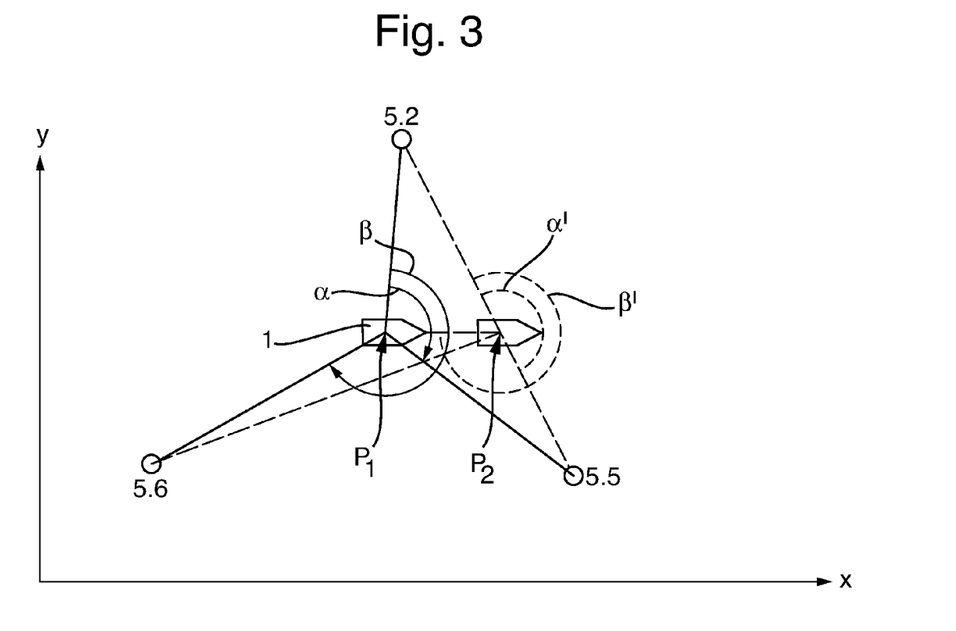
FIG. 3 shows changes in position angles with respect to a vessel in conjunction with a movement of the vessel in relation to the respective detectors.
Figure 4:
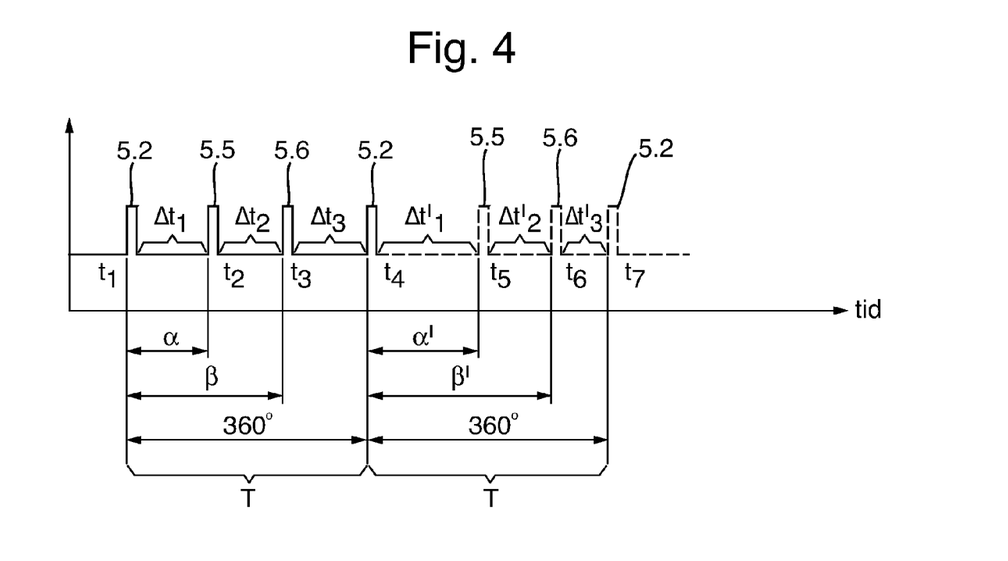
FIG. 4 shows a simplified representation of time intervals forming the basis of the position angle calculations.

FIG. 3 shows a simplified illustration of a vessel that moves from position P1 to position P2, which leads to a mutual change of the time intervals $\Delta t1$, $\Delta t2$, $\Delta t3$ between the respective detection signals coming from detectors 5.2, 5.6 and 5.5 in the shown example see also FIG. 4. After the vessel has moved to P2, the time intervals $\Delta t1'$, $\Delta t2'$, $\Delta t3'$ are changed, as shown in FIG. 4, without changing the time T. The time T equals the total sum of $\Delta t1$, $\Delta t2$, $\Delta t3$, and $\Delta t1'$, $\Delta t2'$, $\Delta t3'$, respectively +/− a small error, and corresponds to the total time between every time the radar beam hits the respective detectors 5.2, 5.6 and 5.5 as shown on the figure, and consequently the angle relationships between the detectors and the vessel have also changed accordingly.

Figure 5:
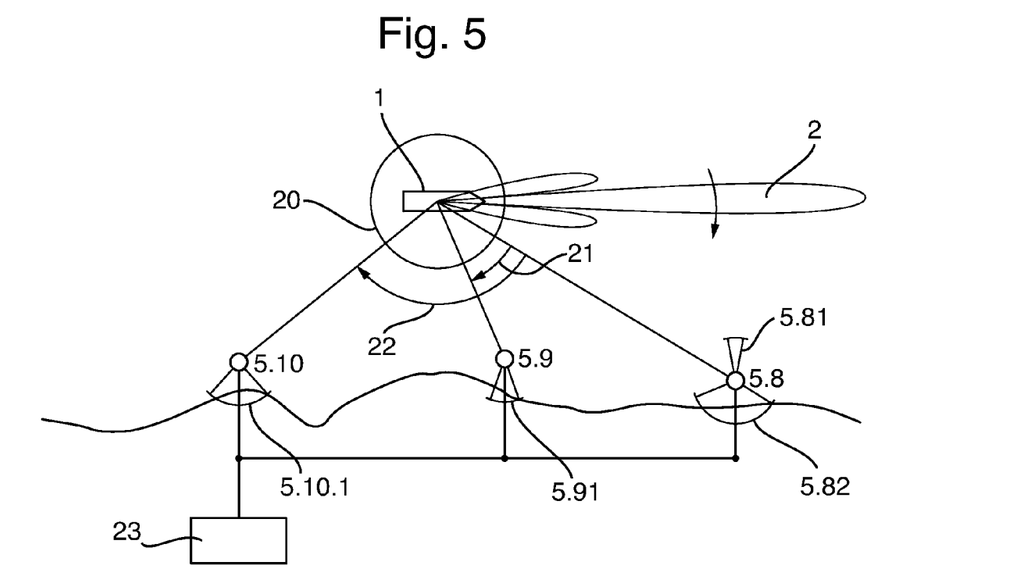
FIG. 5 shows an arrangement of detectors, their sensitivity being limited in specific sectors.

FIG. 4 shows the timing signals t1 to t7 in a simplified way. These form the basis for calculating the angular difference between the vessel and the detectors when the revolution rate, i.e., the time T for one rotation of the radar antenna 2 is known or calculated. This implies that the time interval from when the signal strikes the detector 5.2 until it again strikes the detector 5.2 is 360 degrees +/− a small angular error that is dependent on the speed of the vessel relative to the rotation speed of the antenna 2 and mowing direction, speed and distance of the vessel relative the respective detectors 5.1 to 5.7, which clearly is obtained by additionally using phase shift as more closely described above. For simplicity, this error is not shown on the figures. The correction is included as part of the calculation basis for the position determination in the signal processing unit 10. The time interval between the detector 5.2 and the detector 5.6 is $\Delta t1$, and corresponds the angle $\alpha$. The time interval between the detector 5.2 and the detector 5.5 is $\Delta t2$, and corresponds the angle $\beta$. $\Delta t3$ is equal to 360 degrees minus the sum of $\alpha$ and $\beta$. After a position change from P1 to P2, both time interval and angular distribution are changed into $\Delta t1'$, $\Delta t2'$, $\Delta t3'$, and $\alpha'$ and $\beta'$ are changed correspondingly FIG. 5 shows how the sensitivity range and/or shielding of the detectors against undesired/interfering signals are delimited in terms of sectors, 5.8.1, 5.8.2, 5.9.1 and 5.10.1, especially from areas not included in determination of position or other relevant function. This can apply to signals/reflections or other disruptive form of signal emission. The figure shows a vessel 1 which with a sweeping radar beam 2 which in the course of a 360 degrees sweep 20 strikes the detector 5.8 and forms an angle 21 to the detector 5.9, and then the angle 22 to the detector 5.10. The requirement regarding uniqueness for the determination of position of vessel 1 is thereby fulfilled. A local signal processing unit 23 communicates with the current detectors 5.8 to 5.10, in the figure only shown in a number of three, although the number of detectors may be greater. The signal processing unit 23 is adapted to convey information to the respective users of the system.

From the foregoing and by studying the FIGS. 1-5, it will be understood that by means of at least three activated detector units placed at defined, known fixed and/or changeable positions in said areas, places or installations, it is possible successively to pick up the sweeping radar signal.

Signal vectors are successively established between the vessel 1 and the respective positions for the detector devices, such as 5.2, 5.5 and 5.6 shown on FIGS. 1a, 3 and 4, as the radar signal by its rotational sweep successively hits the respective detector units.

As described above, it is possible to estimate angles between the successive signal vectors as a function of the time intervals between detected signals as the radar signal's beam hits the respective detectors in repeated cycles, for example by point of times t1, t2, t3, respectively, t4, t5, t6, and t7, etc. This makes it possible to define and calculate, on the basis of the estimated signal vector angles, a common intersection point, such as P1, and P2 respectively shown on FIG. 3 for vectors for determination of the position of the vessel. On the basis of repeated cycles of radar signal beam rotational sweep, these calculation steps may be repeated in order to determine the vessel 1 incremental positional change, i.e. from e.g. P1 to P2 and hence the course and speed of the vessel.

As mentioned above, it is not always that all detector units are hit by a radar signal or that the detected radar signal on one or more detector units is optimal for calculation of the position of a vessel, its incremental position direction, course and speed. Therefore, it is within the scope of the invention to enable signal processing of the radar signals received from the detector and which arrive from the vessel, by continuously selecting those at any time optimal combinations of said measured time intervals as a function of mutual geometrical relationships between the vessel and the respective positions of the detectors, wherein the selections preferably are made as a function of one or more of: angular distribution between signal vectors, mutual distance between signal vectors, signal quality of the received signals and the signal strength of the received signals.

By the method according to the invention, it will be possible to compare the vessel position, speed and/or course with acceptable values that are pre-set relative to fixed or moving obstacles in the waters in which the vessel(s) are located. In this way a warning and alarm situation may be initiated if the vessel movements, e.g. speed deviate from a normal operation situation. This means also partly or total loss of speed and/or that the radar signals from the vessel cease.

To summarize, by the constructions in FIG. 1-5 it is possible to detect radar signals from one or more vessels in these waters to determine respective position, speed and course of the vessel or vessels, and warn if these moving obstacles in the form of said vessels are in danger of colliding with each other or at least one of the vessels is in danger of colliding with other obstacles.

It should be further understood that it may additionally be advantageous to detect characteristic signal patterns and/or signal modulations of said radar signal from said vessel or vessels for the identification of the vessel's identity and/or operating condition.

It may be understood that by using several detector units, the detection ought to be operated with a common time reference and a co-ordinated signal processing.

The said warning to the vessel or the vessels and/or a central surveillance unit or a warning authority may be via radio- or other telecommunications links, but can for instance in communication with the vessels be made optical or acoustic. It is imagined that mutual communication between the detector units and from these to the signal processing unit 10 may be effected through electrical wiring, optical cabling, directive r.f. communication, directive optical communication or a combination of any of these. It is also imagined that warnings and alarm signals can be adapted to be received by the vessel radar receiver unit with associated facilities that are designed to give warning and alarm signals to the crew.

In the event that not a sufficient number of detector units briefly pick up radar signals from the vessel, the signal processing unit 10 may correspondingly briefly decide to let the natural movement or movement pattern of the vessel, for example course and speed, form a prediction of the next or nearest position calculation. In addition, it is natural in the signal processing unit (a CPU) to apply statistical methods for error corrections in connection with registration of occasional errors and deviations received from the detectors, as the prediction of new positions is based on a number of previous position calculations. Said statistical methods may be used e.g. in the form of algorithms known per se and/or filtering technique known per se related to a movement average in order to predict the vessel's course and speed based on historical data.

By detecting and recording phase shift variations in detected, pulsed radar signals due to the vessel movement, it is possible to let these phase shifts variations serve as additional variables when calculating the vessel position and/or distinguish between several radar signal transmitters and/or vessels which transmit sweeping radar signals.

As partially illustrated above, the detection with associated signal processing will involve being able to receive and further transmit message information and/or identification from the at least one vessel by, in conjunction with modulation of the transmitted radar signal from the vessel, to superimpose in coded form the information, for example information about the vessel, its identity etc. Likewise can transfer of various forms of messaging such as emergency/alarm situations etc. be relayed via the vessel radar signal in coded form and which is received via the detectors and is decoded into readable information.

Although in the time diagrams as shown, there is as a pre-condition at least three detector units to determine best possible the position of one or more vessels, it will be understood that there may well be used more detector units to increase the positional accuracy by the determination of such a position or positions.

Figure 6:
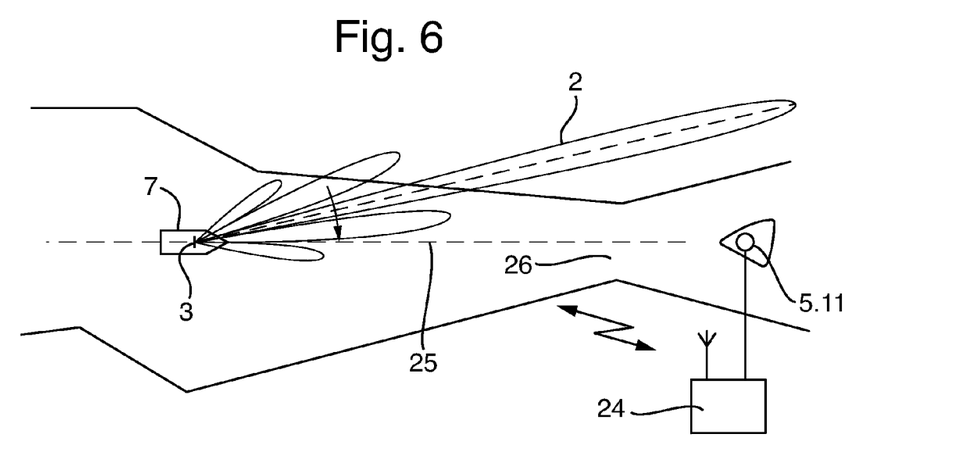
FIG. 6 shows a simplified application of the method based on a single detector located in connection with a collision object.

In FIG. 6 is shown the vessel 1 having a radar beam 2 rotating about the axis 3 and sweeping the detector 5.11 at approximately constant time intervals and where any possible deviation from a course position line 25 is detected because the time interval does not remain constant. As long as the vessel 1 moves without deviation along the course position line 25 towards a collision object such as islet or rock, where also the detector 5.11 is localized, normally no time interval differences between the successive radar beam sweeps that hits the detector will be detected. If the time interval relative to a fixed time reference changes plus or minus, the vessel will pass on either side of the position line 25. Implementation of a phase shift relative to the PRF/PRI will similarly result in a greater resolution in connection with angle calculation and a precision resulting there from.

This example with only one detector indicates a simplified, but efficient and inexpensive surveillance function regarding the vessel's position and movement. This means that the detector 5.11 will, at an early stage in a sailing course of the vessel 1 heading incorrectly towards the collision object, contribute to the vessel 1 being notified by alarm signal, using light emitter or sound emitters to inform the crew on the vessel to change course, in order to pass the collision object at a safe distance.

The detector 5.11 will by the measured time interval deviations in the received radar signal from the vessel 1, i.e. from the "nominal" collision course 25, ensure that the vessel will be notified by visible or audible signal, or by other means that the course no longer is dangerous, or possibly indicating by trigging an alarm that the sailing course for the vessel is still dangerous and must be changed. This implies that this solution is only to determine to what extent the vessel in fact is located on the course position line towards the detector and a collision probability, which in certain waters will be sufficient to avoid collision with an object.

The system may include a control unit 24 to which the detector 5.11 is connected, as said control unit 24 may be adapted to deal with or relay alarms and/or alerts and other functions, such as operating said light and/or audio sources, etc.

By this it will be understood that it is possible successively to detect the sweeping radar signal from the vessel using at least one detector device 5.11 located at a position on, or in the immediate vicinity of a potential collision object for a vessel.

In this aspect of the invention, it is appropriate to establish a reference vector which coincides with the course position line 25 which leads towards/from the collision object at which the detector device 5.11 is located.

It may also be established, when the vessel 1 is at an initial area of the course positioning line, as shown on FIG. 6, a first signal vector between the vessel 1 and the position of the detector unit 5.11 when the radar signal 2 by its rotational sweep initially hits the detector device 5.11, i.e. when the vessel is on the course position line 25, and the first signal vector and reference vector thus coincide.

On the basis of repeated cycles of the rotational sweep of the radar signal beam 2 an angle between the first signal vector which is the same as the reference vector may be calculated, i.e. as a function of time intervals between signals which successively then are detected from the radar signal beam 2 in order to determine any incremental course change of the vessel 1 and compare this with acceptable specified limit values.

An alarm situation may then possibly be initiated if the course change of the vessel 1 does not meet with the limit values, i.e. that the vessel 1 has not made a course change away from the reference vector (course position line 25) at the beginning of a danger area 26 along the course position line, or if the radar signals from the vessel 1 cease.

As mentioned in connection with FIGS. 1-5, it is possible also to detect characteristic signal patterns and/or signal modulations in the radar signal from the vessel in order to identify the vessel identity and/or operating condition. Also affected by the detection is that the electromagnetic signals which are not related to the horizontal sweeping radar signals from the vessel, are suppressed or shielded. An alarm situation may yield sending warnings to the vessel and/or a central surveillance unit or notification authority.

As known from the solution described for FIGS. 1-5 it will here be possible to identify the vessel 1 for establishing of a so-called fingerprint of said vessel or vessels, based on the characteristic features and/or differences in the composition and properties of transmitted radar signal, as said characteristic features and/or differences are related to at least one of: the radar signal modulation, frequency, pulse repetition frequency (PRF/PRI), pulse length, shape, side lobes and opening angles and the vessel antenna rotation pattern and/or speed.

Within this concept is present that the detection with associated signal processing may include being able to receive and transmit message information and/or identification from the vessel by, in conjunction with modulation of the radar signal transmitted from the vessel superimposing in coded form information, e.g. vessel identity, alarm situation onboard or recorded on the vessel, state of emergency for the vessel and/or other forms of messaging being detectable, and that the coded information is decoded into readable information.

The invention is distinguished from others from other known position determination systems by establishing an invulnerable system of passive detectors which are appropriately located and which due to passive character and simple design can form a not easily discoverable surveillance system, which can easily be integrated as a part of other functions and equipment that have other monitoring functions, e.g. a coastal radar system with limited coverage area and where the invention can constitute a supplement in the form of a virtually sabotage safe back-up and/or supplemental system.

This supplement to existing systems or as a stand-alone system is important, as an active land-based or position specific, floating radar system is known to be vulnerable and easy to put out of action in a war or sabotage similar situation. In addition, such a known radar system is also more maintenance dependent than would be required by the solution enabled by the present invention.

A further feature of the signal processing consists of a continuous selection of those for the position determination optimal time interval combinations related to the mutual geometric relations between the vessel and the detector positions, and distances and signal strength. Relationships like distance, signal strength and sector-related limits or shielding for individual detectors, may be appropriate with respect to the optimization of position calculation.

It will thus be understood that one detector or a plurality of detectors with a common time reference and coordinated signal processing, can form an important part of an autonomous and independent system for surveillance of vessels.

Alternatively, such a system according to the invention, related to the embodiment of FIG. 6, may constitute a supplementary system to e.g. a conventional radar system for coastal operation or for other waters and/or act as a back-up system in the event of operational failure of another system which has a surveillance function.

The present invention therefore provides a measurement methodology and an efficient, inexpensive and robust system which advantageously may consist of one or more detector devices with known position(s) and which may be positioned on solid ground, vessel(s), offshore installations, buoys, or a combination thereof.

It is also obvious that the information about the vessel that is obtained by the invention may also have a useful value for the general maneuvering of the vessel, for example in the form of lighting controls, in narrow waters or other form of signal triggering release which is related to the maneuvering, presence and positions of the vessel(s).

The amount of signal information that can be detected and calculated forms the basis for various forms of warning and alarm criteria. For example, the invention could contribute to avoid a shipping disaster. This is based on characteristic patterns of movement that can be caused by abnormal maneuvering as e.g. may be due to inattention, to fall asleep, "nod off" etc. resulting in that the operational vessel's carrying crew is indisposed from performing their duties and/or other problems with the propulsion and/or navigation, the loss of radar signal etc.

Furthermore, on basis of the received radar signal, the meteorological conditions can be interpreted to imply that the vessel has problems. Such a situation can e.g. be related to the type and size of the vessel and type of waters during a given weather condition. A situation in which a vessel encounters problems in heavy seas, will naturally be reflected in the signal character of the radar signal received by the respective detectors, in that the radar sweeps easily can vary with the movements of the vessel, and that variations in revolution rate is often a result of strong wind and wave influence.

In the context of detector positioning and synchronization/time indication it may be appropriate to integrate in one or more detector units a module of a different position determining secondary system such as GPS or the like, in order to facilitate a detector array, especially where it may be appropriate with fast movements/changes of detector positions, e.g. in the military and/or other operational situations where there is a demand for mobility upon deployment of detectors.

In the context of a limited system consisting of one or a few detector devices and/or in areas where full coverage is not established, it is possible to establish a system for warning or alarm when a vessel has course or movement pattern which totally or partially in time and direction may hit a danger area which is equipped with at least one detector, such as described above in connection with FIG. 6. The sweeping signal patterns registered by the detector(s), constitute a characteristic pattern which, by using subsequent signal processing, can predict a potentially hazardous situation which is relayed to the relevant or responsible authorities by known methods in the form of an alert, an alarm or other methods to prevent an accident/disaster.

Although the detector installation shown and described with reference to FIG. 6 can be comprised of a single and independent unit 5.11, it is however possible to imagine a cooperating array of several detectors associated with course deviation detection, but without necessarily to be included in a system that is geometrically distributed for establishing a unique surveillance system for a limited area.

In general, the method and system of the invention is intended to be used for a large detection area and used to obtain full or adequate coverage, even in case of loss of function or detection ability at one or more detectors.

Furthermore, the invention enables also measures concerning the system installation and operation, such as camouflage of detection equipment in the field/terrain, and that the invention enables the system to be equipped with a sleep function until activation thereof by receiving sweeping radar signals, the sleep function provided in order to save power in case of no traffic in the area.

The precision of the position determination is a direct result of the exact angle calculations and recordings, which in turn depend on the exact definitions of start and end point of the time intervals within a radar sweep. This can be achieved by using various known methods for signal processing, statistical and dynamic signal processing and analysis of multiple, repeated signals, for example a weighted movement.

All the received detector signals emitted from one or more vessels are continuously calculated in the signal processing unit in order to find the best angle combinations which are optimal for calculation of position of the vessel(s) within a given coverage area that changes as the vessels move. By the angle combination is meant the angles seen from the vessel and to the respective sensors being swept by the radar antenna, see FIG. 5.

As previously mentioned additional information is necessary to obtain a reliable identification and mapping of up to several simultaneously operating radar signal sources related to the respective vessel. It is also appropriate to utilize the signal information received by the receiving detectors as additional information for statistical signal analysis. Such signal information may provide a basis for detection of the detector signal maxima, side lobes in the vessel radar signal beam, conditions by structural details on the vessel, the radar signal beam frequency, pulse repetition frequency/interval (e.g. related to radar range setting), pulse length, pulse power, beam width, signal reflections from terrain and/or other vessels, the vessel antenna sweep or rotational speed, and the modulation type in the signal beam.

In certain cases it may also be advantageous to use the PRF/PRI as time reference as input for the angle calculation relative to the total time for an antenna rotation. In addition, there may be used various filtering functions for in the calculation to suppress the detector signals which from their position(s) relative to the vessel do not positively contribute to a determination of position. Such filtering functions may include e.g. correction and correlation algorithms adapted to the natural movement pattern of a seagoing vessel.

The system range is mainly limited only by the earth's curvature (line of sight). Due to high transmitted power and low attenuation of the directly received (one way) signals that hit the respective receiving devices (detectors), a large coverage area for surveillance of one or more vessels is achievable.

The signal information from the respective detectors can be communicated via a local network, so that the signal processing partly can be made locally and partly centrally or in connection with a surveillance centre or the like. Warning and hazard alert signals are transmitted to the vessel via established communication systems.

The invention is characterized as a low cost system with a low level of complexity in relation to known systems it is natural to compare it with. The system concept is robust and largely invulnerable as regards sabotage, system failure or the like, inter alia because the detectors are deployed over a large area and can operate even if some of the detectors are disabled. The receiver units can be co-located/integrated with a radar beacon (Racon) and both systems are adapted to receive radar signals. Thus, certain common functions and features may be utilized.

The invention claimed is:

1. A method for determining at least one motion characteristic in terms of position, speed and/or course of at least one marine vessel that moves in waters relative to fixed or floating radar signal reflective areas, locations or installations, said vessel transmitting at least one rotational sweeping radar signal in the horizontal plane and which in relation to known positions causes the determination of said at least one motion characteristic, wherein the method comprises:

a) providing at least three detectors communicating with a signal processing unit and detecting said radar signal using the at least three detectors placed at defined, known positions in said areas, locations or installations successively receiving the sweeping radar signal, b) establishing, with the signal processing unit, successive signal vectors between the vessel and respective positions of the detectors as the radar signal, by its rotational sweep, successively hits the respective ones of the detectors, c) at the signal processing unit, calculating angles between the successive signal vectors as a function of time intervals between signals which are detected as the radar signal beam hits the respective detectors in repeated cycles, d) at the signal processing unit, calculating on the basis of estimated signal vector angles at a common intersection point for the signal vectors to determine the position of the vessel, e) on the basis of repeated cycles of the radar signal beam rotation sweep repeating the steps a)-d), the signal processing unit determines incremental position changes to determine the speed, course and patterns of movement of the vessel, f) in the signal processing in steps a)-e), using the radar signals received from the detectors and originating from the vessel, there is a continuous selection of optimal combinations of said time intervals as a function of mutual geometric relations between the vessel and the respective positions of the detectors, wherein the selection takes place as a function of one or more of: angular distribution between the signal vectors, mutual spacing between signal vectors, signal quality of the received signals and the signal strength of the received signals, g) at the signal processing unit, comparing the vessel position, speed and/or course with acceptable limit values relative to fixed or moving obstacles in the waters where the vessel is located, and h) initiating, at the signal processing unit, alert functions, if the vessel movements exceed these limit values or if the radar signals from the vessel cease, said alert functions comprising a notification to at least one of an authority, a surveillance unit, and one or more of the vessels if such movable obstacles in the form of said vessels are in danger of colliding with each other or at least one of the vessels is in danger of colliding with other obstacles.

2. The method according to claim 1, wherein radar signals from at least two vessels in said waters are detected to determine the position, speed and course of the vessels, respectively.

3. The method according to claim 1, wherein at least one of characteristic signal patterns and signal modulations in said radar signal from said vessel or vessels are detected to obtain identification of identity or operating condition of the vessel.

4. The method according to claim 1, wherein upon the detection by the detectors to cause suppression or shielding thereof of electromagnetic signals which are not related to the horizontal sweeping radar signal from a vessel.

5. The method according to claim 1, wherein upon the detection by the detectors to cause suppression thereof of side lobes of the horizontal sweeping radar signal from the vessel.

6. The method according to claim 1, wherein movement pattern, course and speed of the vessel is included in a predictive calculation of a next position of the vessel.

7. The method according to claim 1, wherein statistical methods for error correction are applied in at least one of steps c), d) and e), in conjunction with errors and deviations in signals received from the detectors, a prediction of new positions of the vessel is based on a number of previous vessel position calculations stored in and derivable from a database.

8. The method according to claim 7, wherein at least one of algorithms and filtering technique related to motion average is applied as said statistical methods.

9. The method according to claim 1, wherein identification of the vessel or vessels is made for establishing a fingerprint of said vessel or vessels, based on at least one of characteristic features, differences in composition, and properties of the transmitted radar signal, and being related to at least one of: radar signal modulation, radar signal frequency, radar signal pulse repetition frequency (PRF/PRI), radar signal pulse length, radar signal shape, radar signal side lobes and opening angles, and vessel radar antenna rotation pattern and speed.

10. The method according to claim 1, wherein phase shift variations in detected pulsed radar signal(s) due to the vessel's motion are detected and recorded, said phase shift variations serving as additional variables in at least one of:

calculation of a vessel position, distinguishing between multiple radar signal transmitters, and distinguishing between vessels transmitting sweeping radar signals.

11. The method according to claim 1, wherein signal processing is adapted for calculation of position of a vessel or vessels to additionally enable control of installations along a vessel sailing route for alerting of presence of the installations, including control of /visible signals or audible signals.

12. The method according to claim 1, wherein detection and associated signal processing includes receiving from the at least one vessel in conjunction with modulation of radar signal transmitted from the vessel(s), coded information superimposed on the radar signal, and wherein—the received coded information, related to at least one of vessel identity, alarm condition onboard in or registered on the vessel, state of emergency for the vessel and other vessel messaging is decoded into readable information and relayed.

13. A method for determining at least one motion characteristic in terms of position, speed and/or course of at least one marine vessel that moves in waters relative to fixed or floating locations or installations, said vessel transmitting at least one rotational sweeping radar signal in the horizontal plane and which in relation to known positions causes the determination of said, at least one, motion characteristic, wherein the method comprises:
- a) providing at least one detector communicating with a signal processing unit, and successively detecting the sweeping radar signal from the vessel using said at least one detector located at a position on or close to a potential collision object for the vessel,
- b) establishing, with the signal processing unit, a reference signal vector coinciding with a course position line leading to said potential collision object,
- c) at the signal processing unit, establishing, when the vessel is at an initial range of the course position line, a first signal vector between the vessel and the position of the at least one detector when the radar signal by its rotational sweep, initially hits the at least one detector, the vessel being on the course position line and the first signal vector and the reference signal vector thus coinciding,
- d) at the signal processing unit, based on repeated cycles of the radar signal beam rotational sweep, calculating, as a function of a time interval, an angle between the first signal vector equal to the reference vector and signals successively detected from the radar signal beam and thereby determine possible incremental change of course of the vessel and compare this with acceptable limit values,
- e) initiating, by the signal processing unit, alert functions, if the change of course of the vessel does not meet the limit values, where meeting the limit values is defined as the vessel failing to change course away from the reference vector along the course position line for the radar signals from the vessel ceasing.

14. The method according to claim 13, wherein at least one of characteristic signal patterns and signal modulations in said radar signal from said vessel or vessels are detected to obtain identification of identity or operating condition of the vessel.

15. The method according to claim 13, wherein upon detection at the at least one detector to cause suppression or shielding of electromagnetic signals that are not related to a horizontal sweeping vessel radar signal.

16. The method according to claim 13, wherein said alert function is relayed as a notification to at least one of: the at least one vessel, a central surveillance unit, and an alert function receiving authority.

17. The method according to claim 13, wherein identification of the at least one vessel is made to establish a so-called fingerprint of said vessel or vessels, based on at least one of characteristic features, differences in the composition of the transmitted radar signal, and being related to at least one of: the radar signal modulation, radar signal frequency, radar signal pulse repetition frequency (PRF/PRI), radar signal pulse length, radar signal shape, radar signal side lobes and opening angles and vessel radar antenna rotation pattern and speed.

18. The method according to of claim 13, wherein detection and associated signal processing includes receiving from the at least one vessel in conjunction with modulation of radar signal transmitted from the vessel, coded information superimposed on the radar signal, and wherein the received coded information is decoded into readable information and relayed.

19. The method according to claim 18, wherein the coded and subsequently decoded information is related to at least one of: vessel identity, alarm condition onboard in or registered on the vessel, state of emergency for the vessel and other forms of vessel messaging.

* * * * *